Aug. 23, 1938.   H. J. HORN   2,127,597
METHOD OF PRODUCING BRAKE DRUMS
Original Filed March 18, 1935   2 Sheets-Sheet 1
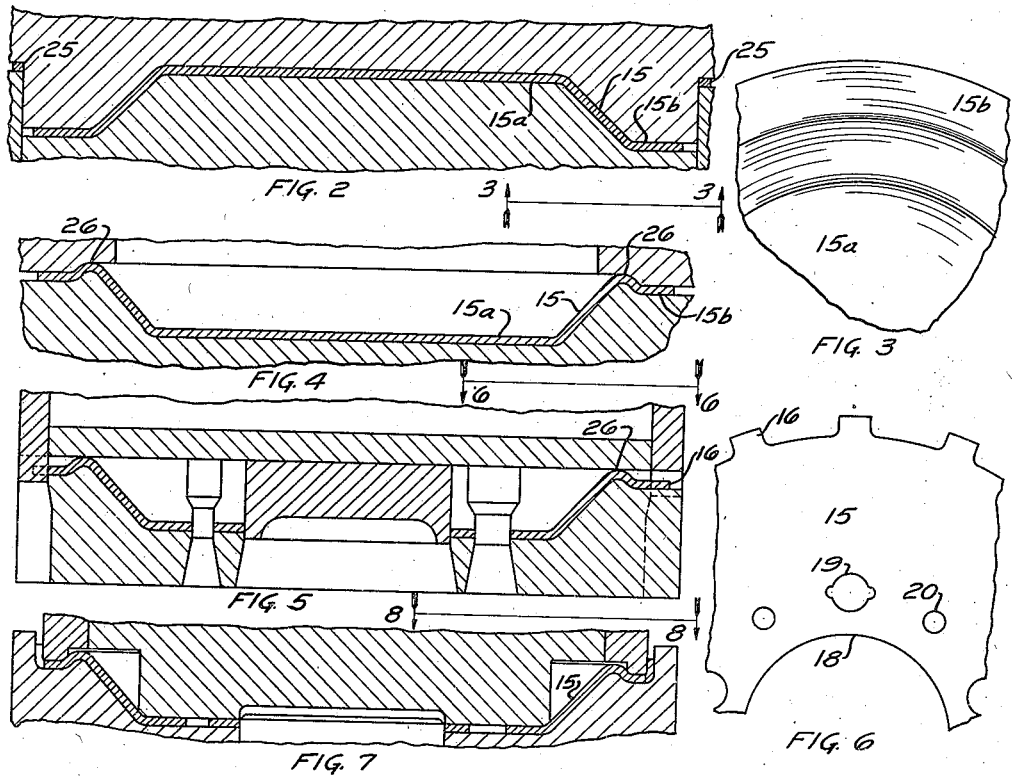
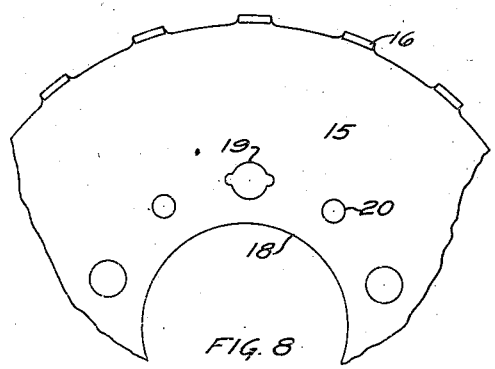
INVENTOR.
HARRY J. HORN
BY Carroll R. Taber
ATTORNEY.

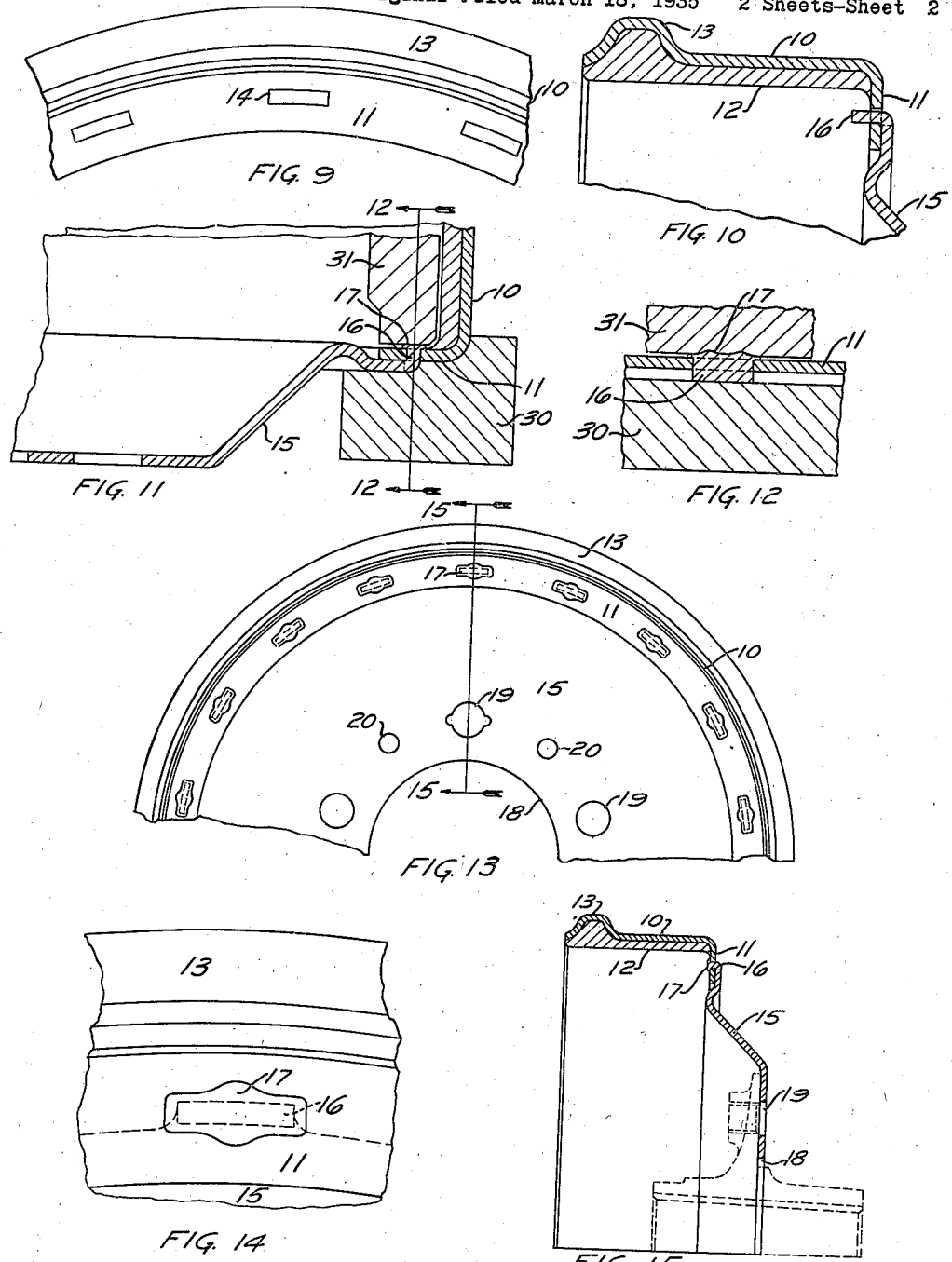

Patented Aug. 23, 1938

2,127,597

UNITED STATES PATENT OFFICE 2,127,597

METHOD OF PRODUCING BRAKE DRUMS

Harry J. Horn, Lansing, Mich., assignor to Motor Wheel Corporation, Lansing, Mich., a corporation of Michigan Original application March 18, 1935, Serial No. 11,609. Patent No. 2,038,842, dated April 28, 1936. Divided and this application March 23, 1936, Serial No. 70,309

2 Claims. (Cl. 29—152.2)

This invention relates to a method of producing brake drums of the type wherein the brake ring and the supporting web therefor are formed separately and then secured to each other to form a composite brake drum. The present application is a division of my co-pending application Serial No. 11,609, filed March 18, 1935, for Brake drums and the method of producing brake drums, issued April 28, 1936, as Patent No. 2,038,842.

The principal object of this invention is to produce such a composite brake drum from a minimum amount of material without impairing the necessary characteristics of rapid heat dissipation and sturdiness required in brake drums under present conditions of use. The manner in which this and other objectives are obtained will more fully appear from the following description taken in connection with the drawings forming a part hereof.

In the drawings:

Figures 1 to 8 inclusive illustrate the various steps in the production of the supporting web;

Figure 9 is a fragmentary front view of the brake ring prior to assembly with the web;

Figure 10 is a partial sectional view of the ring and web after assembly and before being fastened together;

Figure 11 illustrates the manner in which the extremities of the integral projections of the web are deformed to fasten the ring and web together;

Figure 12 is a sectional view taken on substantially the line 12—12 of Figure 11;

Figure 13 is a partial front view of the composite drum after the ring and web have been secured to each other as illustrated in Figure 11;

Figure 14 is an enlarged fragmentary view of the composite drum of Figure 13 showing the relation of the projections carried by the web and the ring; and Figure 15 is a partial sectional view of the composite drum taken on substantially the line 15—15 of Figure 13.

The present method will best be understood by first referring to the illustration in Figures 13 and 15 of the completed composite drum. In these figures the drum is shown as consisting of a brake ring 10 having an inturned flange 11 at one edge thereof. The ring is here shown as of the type having a wear-resisting inner liner 12. The external surface of the ring 10 is preferably deformed as indicated at 13 to provide a stiffening means adjacent the open side thereof. The flange 11 of ring 10 is provided with circumferentially spaced apart rectangular openings 14 which are best shown in Figure 9.

The ring 10 is supported by a generally disk-like web 15. The web is provided with a plurality of integral fingers 16 at its periphery (see Figure 10). The fingers 16 are rectangular in cross section, the cross sectional area thereof being slightly less than the area of the openings 14. The fingers 16 project through the corresponding openings 14 in the ring flange 11 and have their free extremities enlarged as indicated at 17 in Figures 11, 12, 13 and 14. The manner in which these fingers are enlarged to overlie the edges of the cooperating openings 14 will be described presently.

The web 15 is provided with a central opening 18 in order to mount the same over a wheel hub such as that shown in dotted lines in Figure 15. Adjacent the central opening 18 the hub is provided with a series of relatively large holes 19 and an intermediate series of relatively smaller holes 20. The smaller holes 20 are utilized in attaching the web to a hub flange as by riveting and the larger holes 19 are aligned with corresponding holes in the hub flange and receive the securing studs by means of which a wheel may be attached to the hub flange.

The ring 10 and the web 15 of the brake drum illustrated in Figures 13 and 15 are produced separately. The ring 10 is here shown as of the type preferably formed from strip stock rolled into a hoop with the ends welded together. The ring is formed with the flange 11 at one end thereof and the flange is provided with the openings 14. The wear-resisting inner liner 12 may be of any desired material such as cast iron for example, and may be secured to the ring by a centrifugal casting process.

The formation of the web 15 is diagrammatically illustrated in Figures 1 to 8 inclusive. Initially a series of disks are cut from a rectangular blank of metal 25 (Figure 1). Preferably at the same time the disks are struck from the blank they are also subjected to a deforming operation by means of which the disk is deformed to provide a central portion 15a and a peripheral portion 15b lying in spaced parallel planes. Suitable dies for effecting these blanking and drawing operations simultaneously are shown in Figure 2.

The disk 15 is next subjected to the die operation diagrammatically illustrated in Figure 4 to form the annular rib 26 at the inner extremity of the peripheral portion 15b. Thereafter, the edges of the peripheral portion 15b are cut away to produce the circumferentially spaced apart integral projections 16 of rectangular cross section. The cross sectional area of the projections 16 is slightly less than the area of the openings 14 in flange 11 of ring 10 (see Figure 9). The main diameter of the disk 15 after the formation of the projections 16 is such as to locate its periphery radially inwardly of the openings 14 in flange 11 of ring 10 when the ring and web are assembled as hereinafter described.

Preferably at the same time the projections 16 are formed, the central portion 15b of the disk is pierced to produce the openings 18, 19 and 20. Suitable dies for performing these last mentioned operations are diagrammatically illustrated in Figure 5. Figure 6 shows a fragmentary front view of the disk 15 after it has been subjected to the die operations illustrated in Figure 5.

The projections 16 are bent laterally through an arc of substantially 90 degrees in order that they may be inserted through the openings 14 in the flange 11 of ring 10 when the ring and web are assembled. Where it is desired that the fingers formed from projections 16 extend in a truly axial direction they are bent in a single operation as graphically illustrated in Figure 7.

It has been found that the best results are obtained by bending the projections 16 at a point a slight distance outwardly from their base so that after they are bent the axially extending fingers are located radially outwardly of the periphery of the disk 15 a distance at least as great as their thickness. A fragmentary front view of the disk 15 after it has been subjected to the bending operation illustrated in Figure 7 is shown in Figure 8.

The disk as shown in Figures 7 and 8 is in finished form as a supporting web and is ready for assembly with the brake ring. As previously mentioned, the fingers 16 are of the same shape as the openings 14 but are somewhat smaller in cross sectional area. In assembling the web and ring the fingers 16 are inserted into the openings 14 as shown in Figure 10. The web and ring are permanently fastened to each other by flowing the metal at the free extremities of fingers 16. This is done as illustrated in Figure 11. As there shown the ring and web in assembled relation are supported by a fixture 30. This fixture supports the web against both radial and axial displacement. The metal in the fingers 16 is flowed by applying axial pressure against the free extremities thereof with a specially formed punch 31. By applying axial pressure to the ends of the fingers 16 the metal of the fingers is caused to flow axially to a sufficient extent to completely fill the openings 14 in the flange 11. By reason of the special contour of the punch 31 the metal is caused to flow radially and circumferentially as well as axially.

It is desirable to flow the metal of the fingers 16 axially so as to completely fill the openings 14 and thereby to prevent movement between the ring and web and also to provide adequate heat transfer from the ring to the web. It is necessary to flow the metal of fingers 16 radially and circumferentially because it is desired to enlarge the ends of fingers 16 sufficiently to completely overlie the edges of the openings 14 through which the fingers extend. This is desired in order to assure the proper connection between the ring and web and to further facilitate the dissipation of heat from the ring to the web. The manner and extent of the enlargement of the finger ends is clearly shown at 17 in Figures 13 and 14.

By making the web 15 with an overall diameter less than the diameter of the brake ring a considerable saving in material results. By utilizing the integral fingers 16 for fastening the web and ring together the number of parts employed is maintained at a minimum and at the same time a very efficient heat transferring connection is provided. The manner in which the ends of fingers 16 are enlarged insures a secure connection between the web and ring and one which will withstand without destruction or distortion any use to which the drum is usually subjected. All these advantages are obtained at a minimum of expense.

The scope of the invention, which may be embodied in modifications other than those shown and described, is indicated in the appended claims.

I claim:

1. The method of manufacturing brake drums including a brake ring having a radial flange provided with circumferentially spaced apertures, which comprises: forming a disk-like supporting web for the ring having a main diameter locating its periphery inwardly of said ring apertures and having integral projections extending beyond its periphery, assembling the ring and web with the projections of the latter extending through the apertures in the flange of the former, and flowing the metal of said projections in radial and axial directions from the free extremities thereof to completely fill the cooperating apertures through which they extend and to overlie the edges thereof.

2. The method of manufacturing brake drums including a brake ring having a radial flange, which comprises: forming a plurality of circumferentially spaced openings in the flange, forming a disk-like supporting web with a plurality of integral projections at its periphery, said projections being of the same cross sectional configuration but slightly smaller than the apertures in the ring flange, assembling the web and ring with the projections of the former extending through the apertures in the flange of the latter, and flowing the metal of said projections in axial, radial and circumferential directions to completely fill the cooperating apertures and to overlie the edges thereof.

HARRY J. HORN.